United States Patent [19]

Deussner

[11] 4,248,641

[45] Feb. 3, 1981

[54] METHOD AND APPARATUS FOR THE PRODUCTION OF CEMENT CLINKERS FROM MOIST AGGLOMERATED RAW MATERIAL

[75] Inventor: Herbert Deussner, Bergisch-Gladbach, Fed. Rep. of Germany

[73] Assignee: Klöckner-Humboldt-Deutz AG, Fed. Rep. of Germany

[21] Appl. No.: 112,335

[22] Filed: Jan. 15, 1980

Related U.S. Application Data

[62] Division of Ser. No. 912,995, Jun. 6, 1978.

[30] Foreign Application Priority Data

Jun. 10, 1977 [DE] Fed. Rep. of Germany ....... 2726138

[51] Int. Cl.$^3$ .............................................. C04B 7/36
[52] U.S. Cl. ................................................... 106/100
[58] Field of Search ........................................ 106/100

[56] References Cited

U.S. PATENT DOCUMENTS

| | | | |
|---|---|---|---|
| 4,045,162 | 8/1977 | Christiansen | 106/100 |
| 4,119,396 | 10/1978 | Abelitis et al. | 106/100 |

*Primary Examiner*—James Poer
*Attorney, Agent, or Firm*—Hill, Van Santen, Steadman, Chiara & Simpson

[57] ABSTRACT

A method and apparatus for the production of cement clinker from a raw material containing sufficient moisture to be agglomerated wherein the raw material is dried and subsequently subjected to calcining in a series of steps including preheating, deacidification, sintering and cooling. The exhaust gases are passed from the calcining step into the drying step. The raw material exiting from the drying step is pulverized into a fine powder and then transferred directly into the preheating step without intermediate storage.

4 Claims, 2 Drawing Figures

METHOD AND APPARATUS FOR THE PRODUCTION OF CEMENT CLINKERS FROM MOIST AGGLOMERATED RAW MATERIAL

This is a division of application Ser. No. 912,995, filed June 6, 1978.

BACKGROUND OF THE INVENTION

1. Field of the Invention

This invention is in the field of processing agglomerated raw material for the manufacture of cement which involves drying in a drying step, and subsequent thermal treatment in a combustion zone consisting of preheating, deacidification and sintering steps, coupled with a cooling step, and makes efficient use of the exhaust gases from the combustion step.

2. Description of the Prior Art

In the typical method used for the production of cement clinkers, the raw material is passed to cyclone preheaters connected in series and then is calcined in comminuted form to clinkers in a rotary kiln. It frequently happens, however, that the raw material has a very high moisture content so that the preparation of raw material for cement from such high moisture content material is practical only by means of wet procedures. In such procedures, the raw materials are ground wet and homogenized in large slurry silos, resulting in a raw slurry for cement with a water content of approximately 36%. Through the use of filter presses and/or drum filters, it is possible to lower the water content to below about 22%. The remaining water removal may then take place before the actual calcining process by other thermal dehydration means. The raw material agglomerates because of their water content cannot be treated directly in the known calcining process utilizing cyclone preheaters and a rotary kiln.

For the purpose of drying the agglomerated raw material in known cement production installations, the raw material partially dehydrated in a filter press is comminuted in a mixing assembly and then delivered to a stream dryer such as a suspension gas dryer. The raw material leaves this dryer sufficiently dried in the form of gravel with a relatively small amount of coarse grains present. This raw material is then delivered to a storage bunker. It is withdrawn from storage in weighed dosages and then fed to the cyclone preheater which is connected in series with the rotary kiln. For reasons of economy, the exhaust gases from the furnace system are utilized as heating gases in the suspension gas dryer.

The method and apparatus of the prior art thus require additional capital investment and considerable processing if cement raw material of good quality is to be obtained.

SUMMARY OF THE INVENTION

The present invention provides a method and apparatus which is useful for treating agglomerated raw material in a economical way with respect to the heat usage without requiring expenditure for expensive apparatus. In accordance with the present invention, the raw material which is dried in the drying step is disintegrated to a powder form having the fineness of flour and is delivered directly without any intermediate storage to the preheating zone of the calcining step. In this way, an intermediate storage of the agglomerated comminuted raw material in proper particle form is rendered unnecessary, as is an additional metering of the comminuted raw material for charging into the calcination step. With intermediate storage of the raw material, particularly when the material is of a temperature above 100° C., there was an additional danger of a renewed agglomeration and compression of the disintegrated raw material, particularly in view of its substantial hygroscopic characteristics. The raw material according to the present invention which does not go through this intermediate storage possesses optimal properties for the treatment in the subsequent calcination step, with efficient use of the available heat.

DESCRIPTION OF THE PREFERRED EMBODIMENTS

Figure 1:
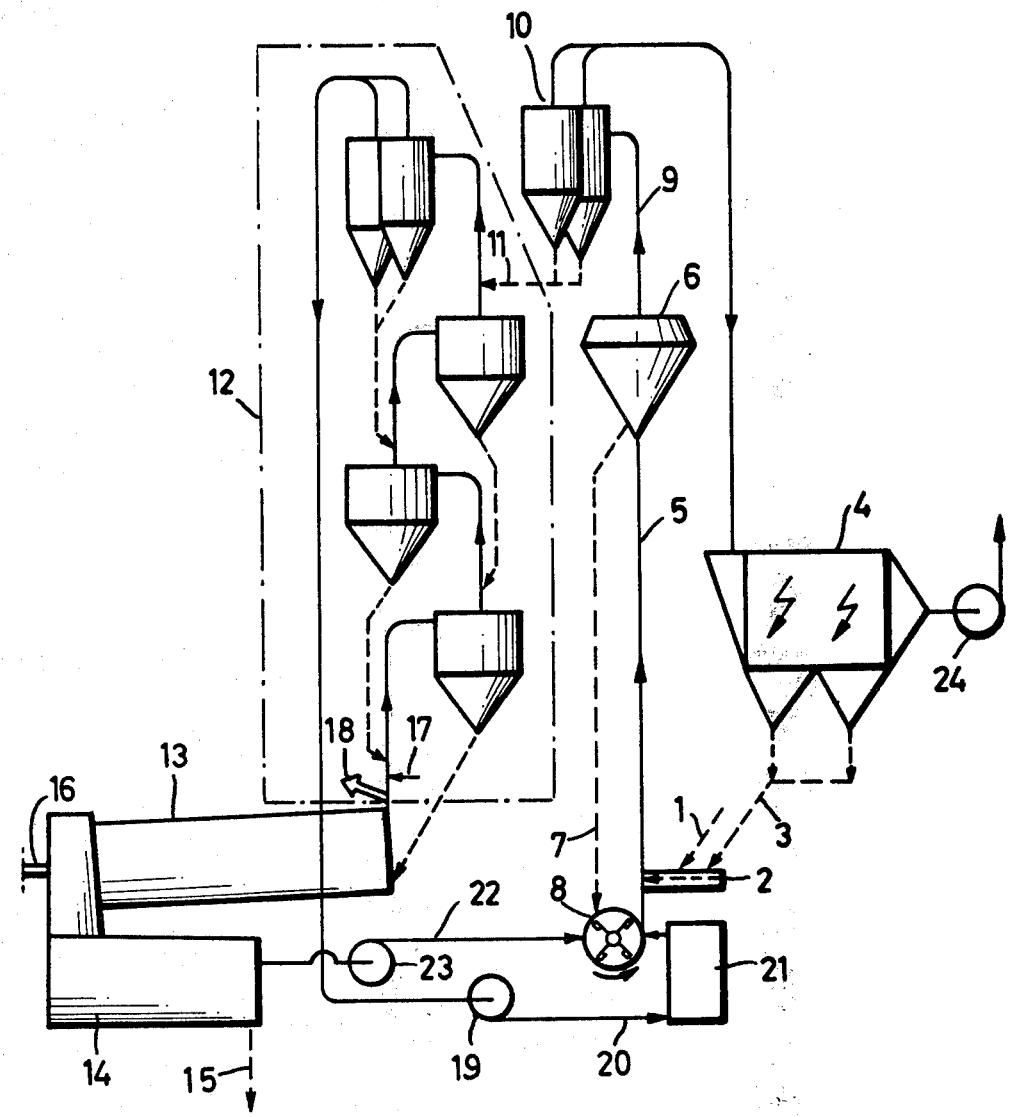
FIG. 1 illustrates an installation for production of cement according to the present invention, including a rotary kiln, a grate cooler, a four step cyclone heat exchanger, and a suspension gas dryer.

In one feature of the present invention, the drying step is conducted with exhaust gases from the calcination step, and also with heated exhaust air from the cooling step. If necessary, additional combustible heat can be supplied. In this way, there exists an improved economy in heat utilization because in addition to the exhaust gas from the calcination step, the cooling air may also be used as a source of heat. Even with raw materials having relatively high moisture contents and severe tendencies to agglomerate, the drying of the raw material according to the present invention and a grading of the same are obtained so that an optimum application of treatment method is made available to the various fractions of raw material present.

In a further feature of the present invention, the drying step is supplied not only with fresh raw material, but with metered amounts of dried, comminuted material and/or filter dust which is recovered from the purification of the exhaust gas. These materials can be proportioned relative to one another so that the raw material to be disintegrated in the mixing assembly has as large a surface area as possible so that it is capable of proper flow characteristics and can be readily transported through the suspension gas dryer.

In another feature of the invention, there is provided a circulation drying with post-comminution for coarse portions of the raw material, whereby the portions of the raw material which are not comminuted suitably for the process in the mixing assembly are treated with hot drying gases for a sufficient period of time and comminuted repeatedly until a fine dust is achieved, which may then be delivered directly into the preheating zone of the calcination step.

The invention also pertains to an apparatus for carrying out the production method according to the present invention, which apparatus is characterized by a suspension gas flow dryer operating in conjunction with a separator or grader and a comminution device. The gas suspension dryer is connected directly with a suspension gas preheater and a sintering furnace having an attached clinker cooler in series with the furnace on the material side. The preheater is preferably a cyclone preheater, and the sintering furnace and clinker cooler are preferably a rotary kiln and a grid cooler, respectively. With this type of system, devices for intermediate storage of the raw material from the drying system and for additional metering of the material from the storage system into the calcination step are no longer necessary so that a substantial reduction in the installation cost results with an overall economic advantage.

One of the advantages of the apparatus used according to the present invention results when the suspension gas preheater and the dryer are connected in common with at least one exhaust gas blower for the feeding of hot exhaust gases from the sintering furnace, whereby on the hot side an optimal coupling of the drying system with the calcination system is achieved with a minimum amount of expenditure. The dryer may also be connected to the clinker cooler in which case a feed blower for the cooler exhaust air is used, thereby providing optimal utilization of the heat of the hot cooler exhaust gas.

In another embodiment of the present invention, the sintering furnace at its outlet has a device for partially withdrawing the furnace exhaust gases whereby alkali containing raw materials with high moisture contents may be dried with the aid of the furnace exhaust gases and disintegrated to a dust and the alkalis contained in the wet raw material after thermal treatment of the material in gaseous phase may be removed with a part of the furnace exhaust gases to a substantial extent from the calcining installation, to thereby produce a low alkali cement.

Referring now to the drawings, in FIG. 1 there is illustrated an inlet line 1 for the cement raw material which may be agglomerated due to its high moisture content. The raw material is delivered to a feed device 2 of a stream type dryer including an uptake or riser 5. The riser delivers particles in suspension to a separator or sifter 6 which, in turn, delivers coarser particles through a line 7 into a comminution device 8 such as an impact pulverizer. The feed device 2 may also be supplied with previously dried comminuted raw material and/or, as shown, filter dust 3 from an exhaust gas dust removal precipitator 4, and thus produce a mixture of charging material favorable to optimum drying conditions.

The raw material introduced through the feed device 2 is dried on its way through the riser or uptake 5, the oversized grains being delivered through a line 7 to a comminution device 8. In the comminution device 8, the gravel is comminuted to the fineness of a powder and is again centrifuged into the uptake or riser 5. By means of this circulation with subsequent comminution of coarse particles, a constant stream of powder fine dry material leaves the sifter 6 through a line 9 and is separated in a separating apparatus 10 from the drying medium. The dry material leaves through a line 11 in powder form and is delivered directly, without intermediate storage, to a cyclone preheater generally indicated at reference numeral 12. In the particular form of the invention shown in FIG. 1, the cyclone preheater 12 consists of a four step unit connected in series to a calcining kiln 13 which in turn is connected to a clinker cooler 14. The calcining kiln 13 is preferably a rotary kiln and the cooler 14 is preferably an inclined grate cooler. In this calcining assembly, the raw material is calcined to cement clinker, and the cooled clinker leaves through a line 15 for further processing.

The calcining kiln receives its heat from a burner 16 and also a portion of the calcining heat is introduced into the conduit connecting the calcining kiln 13 and the cyclone preheater 12, this additional heat source being illustrated at reference numeral 17. In addition, partial withdrawal of the exhaust gases from the calcining kiln 13 may be accomplished through a discharge line 18 for the purposes previously mentioned.

The heating of the dryer takes place by means of exhaust gases passing through a line 20 and propelled by means of a blower 19. If necessary, an additional hot air producing means 21 can be added for aiding the material drying. It is also possible to supply heated air through a line 22 from the clinker cooler 14 by means of a blower 23 to the suspension gas flow dryer. The exhaust gases of this dryer are conveyed by means of an exhaust gas blower 24 and are purified in a dust removal installation such as a precipitator 4.

Figure 2:
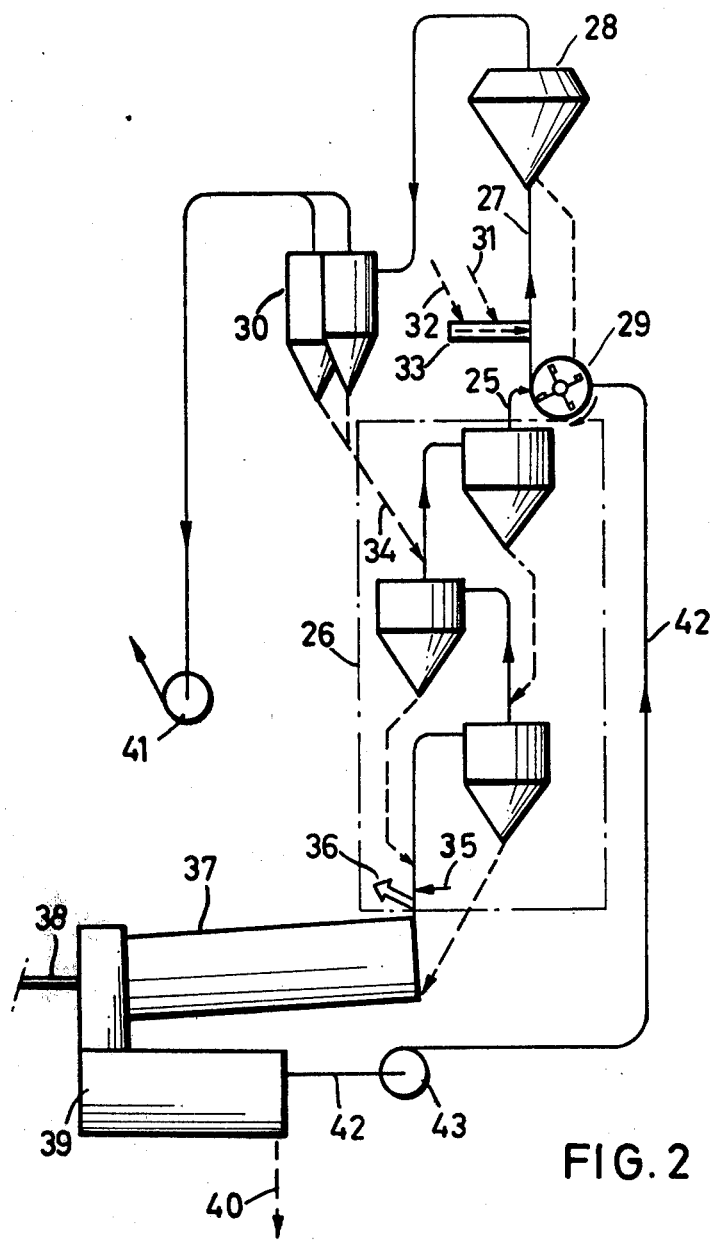
FIG. 2 illustrates a variation of the cement production installation shown in FIG. 1.

A particularly advantageous variation of the method is shown in the installation of FIG. 2. In that FIG., exhaust gases are shown leaving a three step cyclone preheater 26 through a line 25 and are supplied without an intermediate blower to a dryer consisting of an uptake or riser 27, a separator or sifter 28, a comminution device 29, and a separation device 30. The fine grained but agglomerated raw material is introduced by means of a line 31 together with, if desired, already dried raw comminuted material and/or filter dust through a line 32. These materials are introduced into a feed line 33. The separation device by means of a line 34 introduces comminuted raw material directly, without intermediate storage, into the highest stage of a cyclone preheater 26. The preheater may be equipped with an additional heat source 35. A calcining kiln 37 is provided with a burner 38 to accomplish sintering, and an exhaust vent 36 is provided for partial removal of the hot exhaust gases. The calcining kiln 37 feeds a clinker cooler 39, from which the cooled clinker is discharged through a line 40. A blower 41 feeds exhaust gases from the calcining kiln 37 through the cyclone preheater and the dryer, and additional heated air may be provided by a line 42 which communicates with the clinker cooler 39 through the interposition of a blower 43.

The cement production installations described herein utilize measuring and regulating techniques known from modern procedures for the production of cement, and are adaptable to utilization with programmed electro-calculators. Without departing from the framework of the invention, it should be apparent that in addition to the described variations of installations or method of the present invention, other types of suspension gas heat exchangers, for example, may also be used in place of cyclone heat exchangers. Also, drum dryers, centrifugal dryers and the like may be provided to achieve the same advantages for drying and repeated disintegration of the agglomerated raw material to be used in the manufacture of cement.

I claim as my invention:

1. In a method for the production of cement clinker from a raw material containing a sufficient amount of moisture to be agglomerated wherein said raw material is dried in a drying step and subsequently subjected to calcining in a series of steps including preheating, deacidification, sintering and cooling, and wherein the exhaust gases from the calcining step are supplied to the drying step, the improvement which comprises:
   pulverizing the raw material from the drying step into a fine powder and
   transferring the powder directly into the preheating step without intermediate storage.

2. A method according to claim 1 in which:
   heated exhaust air from the cooling step is passed into said drying step.

3. A method according to claim 1 in which: controlled amounts of dried, comminuted raw material are passed into said drying step.

4. A method according to claim 3 which includes the step of:
also supplying dust recovered from the system to said drying step.

* * * * *